United States Patent [19]
Myerson et al.

[11] Patent Number: 5,846,290
[45] Date of Patent: Dec. 8, 1998

[54] METHOD FOR THE RECOVERY OF GROUP IA SALTS DURING THE TREATMENT OF INDUSTRIAL PROCESS WASTE STREAMS

[75] Inventors: Allan S. Myerson, Suffern, N.Y.; Michael W. Cudahy, Jackson, Tenn.

[73] Assignee: Metals Recycling Technologies Corp., Atlanta, Ga.

[21] Appl. No.: 844,294

[22] Filed: Apr. 18, 1997

Related U.S. Application Data

[63] Continuation-in-part of Ser. No. 604,178, Feb. 21, 1996, Pat. No. 5,667,555.

[51] Int. Cl.$^6$ ..................................................... C22B 3/14
[52] U.S. Cl. ........................... 75/419; 75/420; 75/724; 75/961; 423/184; 423/499.1; 423/499.4
[58] Field of Search ................... 423/184, 499.1, 423/499.4; 75/419, 420, 724, 961

[56] References Cited

U.S. PATENT DOCUMENTS

| | | | |
|---|---|---|---|
| 3,515,510 | 6/1970 | Winter et al. | 23/55 |
| 3,743,501 | 7/1973 | Cusanelli et al. | 75/109 |
| 3,849,121 | 11/1974 | Burrows | 423/101 |
| 3,911,076 | 10/1975 | Probert et al. | 423/109 |
| 4,606,765 | 8/1986 | Ferlay | 423/109 |
| 5,208,004 | 5/1993 | Myerson | 423/622 |
| 5,464,596 | 11/1995 | Myerson | 423/101 |
| 5,667,555 | 9/1997 | Myerson et al. | 75/961 |
| 5,683,488 | 11/1997 | Myerson et al. | 75/961 |

FOREIGN PATENT DOCUMENTS

| | | | |
|---|---|---|---|
| 52-18495 | 2/1977 | Japan | 423/184 |

*Primary Examiner*—Melvyn Andrews
*Attorney, Agent, or Firm*—Deveau, Colton & Marquis

[57] ABSTRACT

A method for the production of Group IA salts during a process for the recycling of industrial waste streams containing Group IA compounds and iron and/or zinc compounds, by heating the waste stream in a reducing atmosphere, treating the exhaust fumes from the heating step with an ammonium chloride leaching solution resulting in a Group IA salt containing precipitate, and recovering the Group IA salts from the precipitate.

18 Claims, 3 Drawing Sheets

METHOD FOR THE RECOVERY OF GROUP IA SALTS DURING THE TREATMENT OF INDUSTRIAL PROCESS WASTE STREAMS

STATEMENT OF RELATED APPLICATIONS

This application is a continuation-in-part of application Ser. No. 08/604,178, filed Feb. 21, 1996 now U.S. Pat. No. 5,667,555.

BACKGROUND OF THE INVENTION

1. Field of the Invention

The present invention relates generally to a process for the recovery of usable economically valuable products from industrial waste streams typically comprising zinc compounds and iron compounds. The present invention relates specifically to a process for the recovery of Group IA salts from industrial waste streams comprising Group IA compounds along with zinc compounds and iron compounds, in an overall process in which a relatively pure iron or direct reduced iron product feedstock and a very pure zinc oxide product are produced.

The specific improvement of the present invention is an additional process for recovering sodium chloride and potassium chloride from a waste material cake resulting after a waste stream from a metals-related industrial process has been treated to remove a significant portion of any iron and zinc compounds.

2. Prior Art

Industrial waste streams typically contain components which have economic value if they can be recovered in an economic fashion. For example, U.S. Pat. No. 3,849,121 to Burrows, now expired but which was assigned to a principal of the assignee of the present invention, discloses a method for the selective recovery of zinc oxide from industrial waste. The Burrows method comprises leaching a waste material with an ammonium chloride solution at elevated temperatures, separating iron from solution, treating the solution with zinc metal and cooling the solution to precipitate zinc oxide. The Burrows patent discloses a method to take EAF dust which is mainly a mixture of iron and zinc oxides and, in a series of steps, to separate out and discard the iron oxides and waste metals, so that the resulting zinc-compound-rich solution can be further treated to recover the zinc compounds.

Waste metal process dust typically has varying amounts of other components, in various forms, such as Group IA elements including sodium and potassium, contained in the dust. The Burrows patent does not teach the treatment or recovery of any values from the discarded iron oxide containing precipitates, and does not discuss any method of recovering Group IA salts, such as sodium chloride and potassium chloride, from the process.

U.S. Pat. No. 4,071,357 to Peters discloses a method for recovering metal values which includes a steam distillation step and a calcining step to precipitate zinc carbonate and to convert the zinc carbonate to zinc oxide, respectively. Peters further discloses the use of a solution containing approximately equal amounts of ammonia and carbon to leach the flue dust at room temperature, resulting in the extraction of only about half of the zinc in the dust, almost 7% of the iron, less than 5% of the lead, and less than half of the cadmium. However, Peters does not disclose a method for further treating the removed components not containing zinc compounds, nor of recovering Group IA salts from the process.

As can be seen, there exists a need for a method which will allow the continuous treatment of exhausts and fumes from reduction furnaces or the like to recover Group IA salt values. This need is addressed by the present invention.

BRIEF SUMMARY OF THE INVENTION

The present invention satisfies this need in a method which recovers Group IA salts in conjunction with the recovery of a relatively pure iron product from a waste material or a combination of waste materials from industrial processes, such as waste streams from electric arc furnaces, typically containing zinc or zinc oxide and iron or iron oxide, and exhaust fumes from reduction furnaces, which typically are iron-poor. The non-iron solids and feed and product solutions used and/or produced in the overall process can be recycled such that the process has minimal solid or liquid wastes. Other solids can be recovered by treating other compounds in the waste materials, for example zinc oxide, zinc, metal values, and other residues, all of which can be used in other processes. As an alternative embodiment, iron-rich waste products, such as for example mill scale and used batteries, also can be added to the waste stream feed of the present process.

A waste materials stream such as electric arc furnace (EAF) dust or the flue dust disclosed in Table I herein, is subjected to a combination of processing steps, resulting ultimately in the recovery of certain Group IA salts. An enriched iron compound (an enriched iron cake or EIC) which can be used as a feedstock for steel mills, and other products of value, also can be produced from the general process, and are disclosed in and/or covered by other patent applications and patents assigned to Metals Recycling Technologies Corporation of Atlanta, Georgia US, the assignee of this invention. The EIC typically is rich in direct reduced iron (DRI). Preferably, the precipitate containing iron oxides is removed from a process for the recovery of zinc oxide and zinc metal from industrial waste streams. During the recovery process, carbon compounds can be added to the waste stream, and a cake product is produced from the undissolved iron and carbon compounds, which also can be used as a feedstock for steel mills.

In a preferred embodiment of the process, the waste material stream is heated in a reducing atmosphere in a reduction furnace, resulting in the reduction of the iron compounds into DRI, and the production of combustion products. The DRI can be fed directly to a steel mill as a feed source, and the combustion products, typically in the form of exhaust dusts and fumes, are recovered in a filter means, such as a baghouse or wet scrubber. The exhaust dusts and fumes comprise the majority of the Group IA salt constituents, and the non-iron compounds, such as zinc, cadmium, copper, lead, and calcium compounds.

EAF dust, either alone or in combination with iron-rich waste materials, mill scale, used batteries, or other iron-rich or iron-poor waste materials may be used as the initial feed for the process. This combined waste first is heated in a reducing atmosphere, reducing any iron oxides present to usable DRI. The exhaust vapor from the DRI process is condensed and comprises mainly zinc, lead and cadmium oxides and Group IA chlorides. This waste material then is leached with an ammonium chloride solution resulting in a product solution (leachate) and undissolved materials (precipitate). At steady state the Group IA species reach saturation in the ammonium chloride solution and therefore do not dissolve, remaining with the solids in the filter cake.

In the leaching step, the Group IA salt constituents reach their saturation concentration in the ammonium chloride solution and precipitate out. The leachate comprises metal oxides contained in the waste material, such as lead oxide and cadmium oxide, and zinc and/or zinc oxide. The product solution and the undissolved materials are separated, with the product solution and the undissolved materials being further treated to recover Group IA salts and other valuable components, as appropriate. For example, the remaining product solution can be treated to produce a zinc oxide product of 99% or greater purity. Alternatively, the remaining product solution can be subjected to electrolysis in which zinc metal plates onto the cathode of the electrolysis cell. Any remaining product solution after crystallization or electrolysis can be recycled back to treat incoming waste material.

When processing EAF dusts, zinc-containing wastes and fumes from rotary hearth furnaces, upon reaching steady state, the filter cake obtained after the first leaching step contains sodium chloride and potassium chloride since these have reached their saturation concentration in the ammonium chloride solution. The filter cake comprises true insolubles, which are mainly silicates, and water soluble salts, which are mainly sodium chloride and potassium chloride. The salts can be recovered by:

1. Washing the filter cake with water, dissolving all water soluble salts;
2. Optionally cementing out heavy metals such as lead using powdered zinc; and
3. Crystallizing out sodium chloride and potassium chloride salts either singly or mixed by selective evaporative crystallization or spray drying. The salts then can be dried and bagged and sold.

Therefore, it is an object of the present invention is to provide a waste material recovery process which recovers chemical values including Group IA salts from industrial waste streams, recycles exhaust fumes from furnaces such as electric arc furnaces and reduction furnaces, recycles exhaust fumes from industrial processes such as iron and steel making processes, and recycles other waste materials, including both iron-rich and iron-poor waste materials, to produce valuable products.

Another object of the present invention is to provide a method for recovering Group IA salts from the precipitate from an ammonium chloride leach used to recover zinc oxide.

These objects and other objects, features and advantages of the present invention will become apparent to one skilled in the art after reading the following Detailed Description of a Preferred Embodiment.

DETAILED DESCRIPTION OF A PREFERRED EMBODIMENT

The method disclosed herein is carried out in its best mode in treating the waste material from the waste streams of metal-making processes, industrial or other processes. These waste materials may be combined with other waste materials recovered from furnace exhaust streams. Many processes produce an iron poor waste stream, such as reduction furnaces and iron and steel making processes. Many other processes produce an iron rich waste stream. Other processes remove iron rich materials prior to processing. The iron poor materials can be combined with a typical industrial waste stream which, after treatment, results in an iron rich material suitable for use as a feedstock to a steel mill. Iron rich materials also can be combined with the typical industrial waste stream and the iron poor waste stream.

A typical industrial waste stream used is a flue gas where the charge contains galvanized steel, having the percent composition shown in Table I:

TABLE I

Analysis of Flue Dust

| Component | Percent By Weight |
| --- | --- |
| Zinc Oxide | 30 |
| Iron Oxide | 40 |
| Lead Oxide and Chloride | 6.48 |
| Inert Materials | 9.10 |
| Sodium Oxide and Chloride | 5.00 |
| Calcium Oxide | 2.80 |
| Potassium Oxide and Chloride | 3.00 |
| Manganese Oxide | 1.29 |
| Tin Oxide | 1.13 |
| Aluminum Oxide | 0.38 |
| Magnesium Oxide | 0.33 |
| Chromium Oxide | 0.16 |
| Copper Oxide | 0.06 |
| Silver | 0.05 |
| Unidentified Materials | 0.22 |

A second typical industrial waste stream used is a zinc rich fume from a rotary hearth furnace used in an iron-making or steel-making process, having the percent composition shown in Table II:

TABLE II

Analysis of Rotary Hearth Furnace Fume

| Component | Percent By Weight |
| --- | --- |
| Zinc Oxide | 70 |
| Lead | 6 |
| Sodium | 3 |
| Potassium | 3 |
| Chloride | 11 |
| Insoluble | 3 |
| Miscellaneous | 4 |

General Process Description

Figure 2:
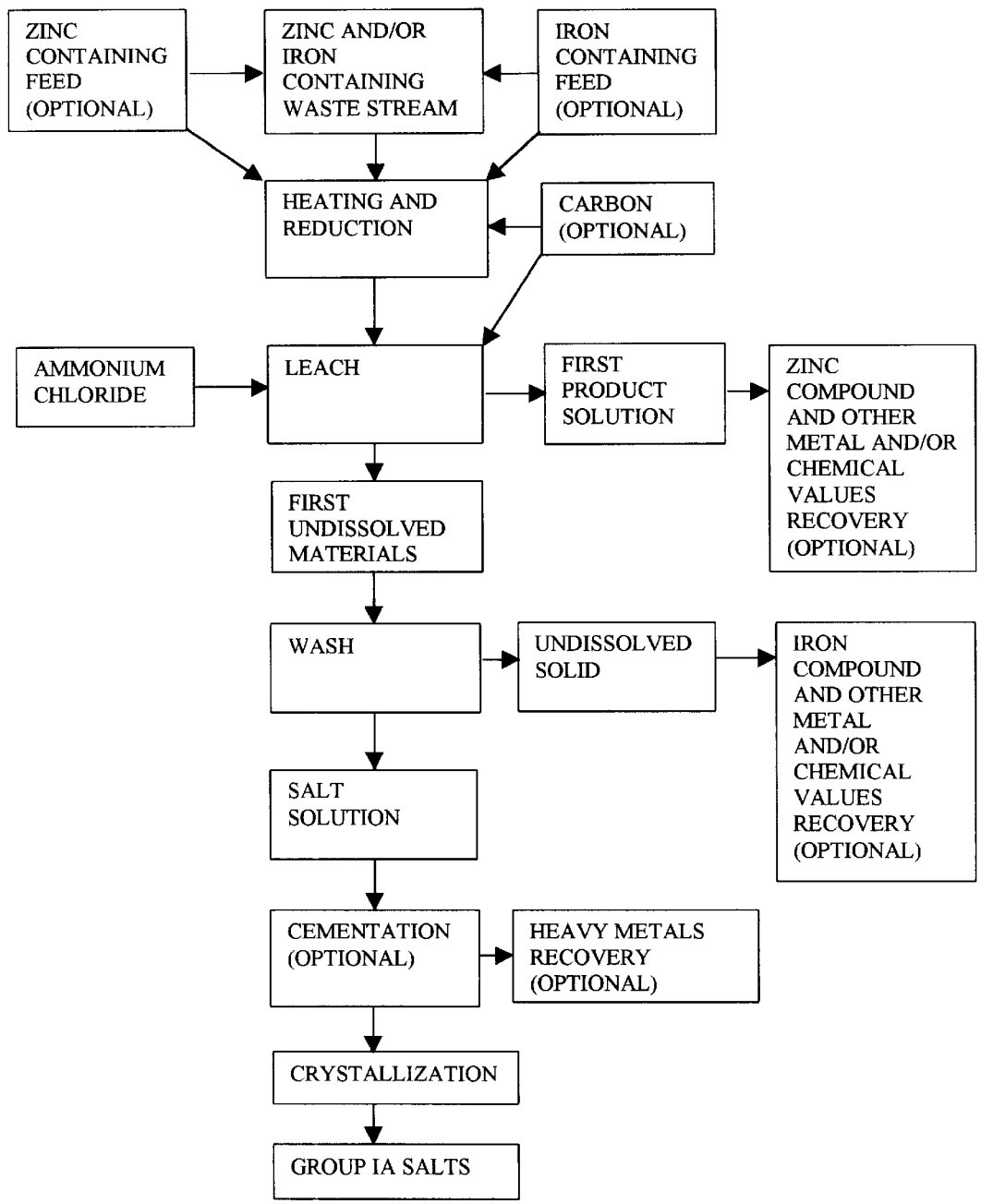
FIG. 2 is a flow chart of the process of the present invention.

Generally, the present process is a novel addition to a continuous method for the recovery of chemical and metal values from waste material streams. The basic process steps for recovering Group IA salts from such a method are shown as a flow chart in FIG. 2 and comprise:

a. Heating a typical industrial process waste material stream comprising Group IA compounds such as from a metal or metal product process, in a reducing atmosphere to produce an exhaust stream (typically fumes);

b. Treating the exhaust stream which may be a waste material combination comprising other waste streams, with an ammonium chloride solution at an elevated temperature to form a product solution and an undissolved precipitate comprising Group IA salts;

c. Separating the product solution from the undissolved precipitate comprising the Group IA salts;

d. Washing the undissolved precipitate to form a salt solution which comprises the Group IA salts and an undissolved solid; and e. Crystallizing out the Group IA salts from the salt solution by evaporative crystallization or spray drying.

Figure 3:
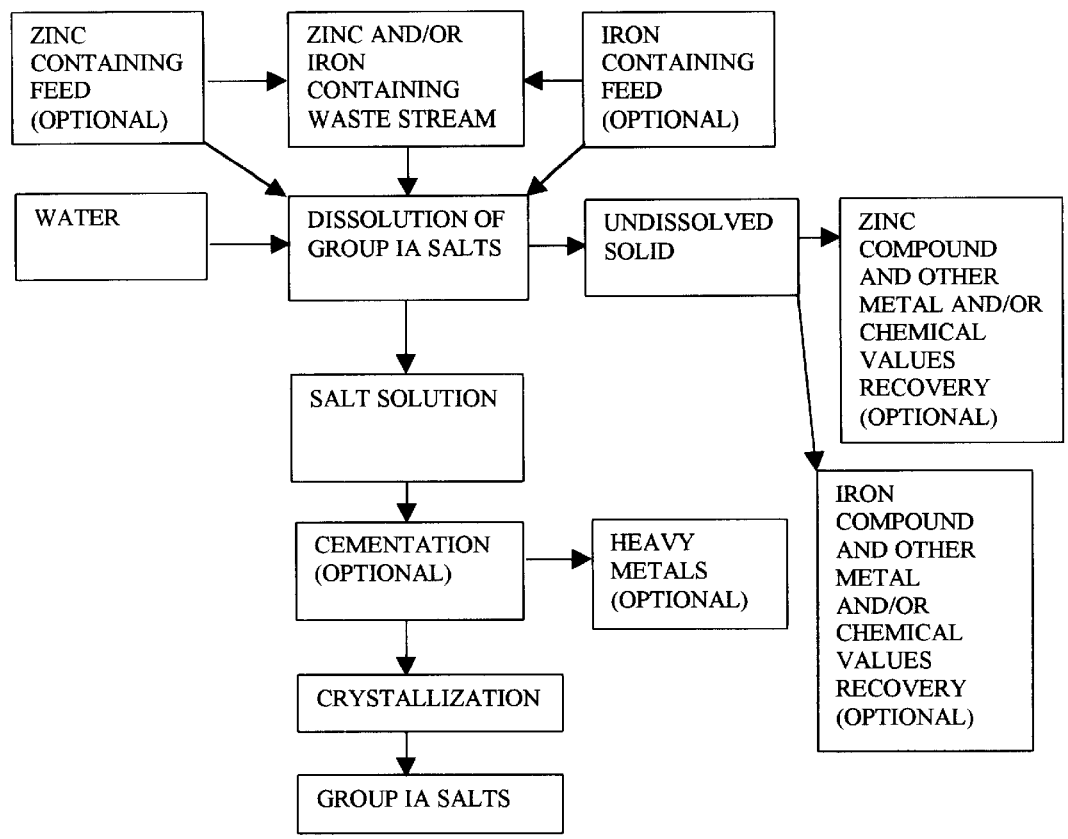
FIG. 3 is a flow chart of an alternate process of the present invention.

An alternative set of process steps for recovering Group IA salts from such a method are shown as a flow chart in FIG. 3 and comprise:

a. Adding a fame from a rotary hearth furnace comprising Group IA salts to water to dissolve the Group IA salts;

b. Filtering out the components of the fume which do not dissolve in the water as undissolved solids; and c. Crystallizing out the Group IA salts from the salt solution by evaporative crystallization or spray drying.

The salt solution may be subjected to a cementation step to remove other compounds. The undissolved solids may be sent to a leaching solution to recover other chemical and/or metal values.

Preferred Embodiment

Figure 1:
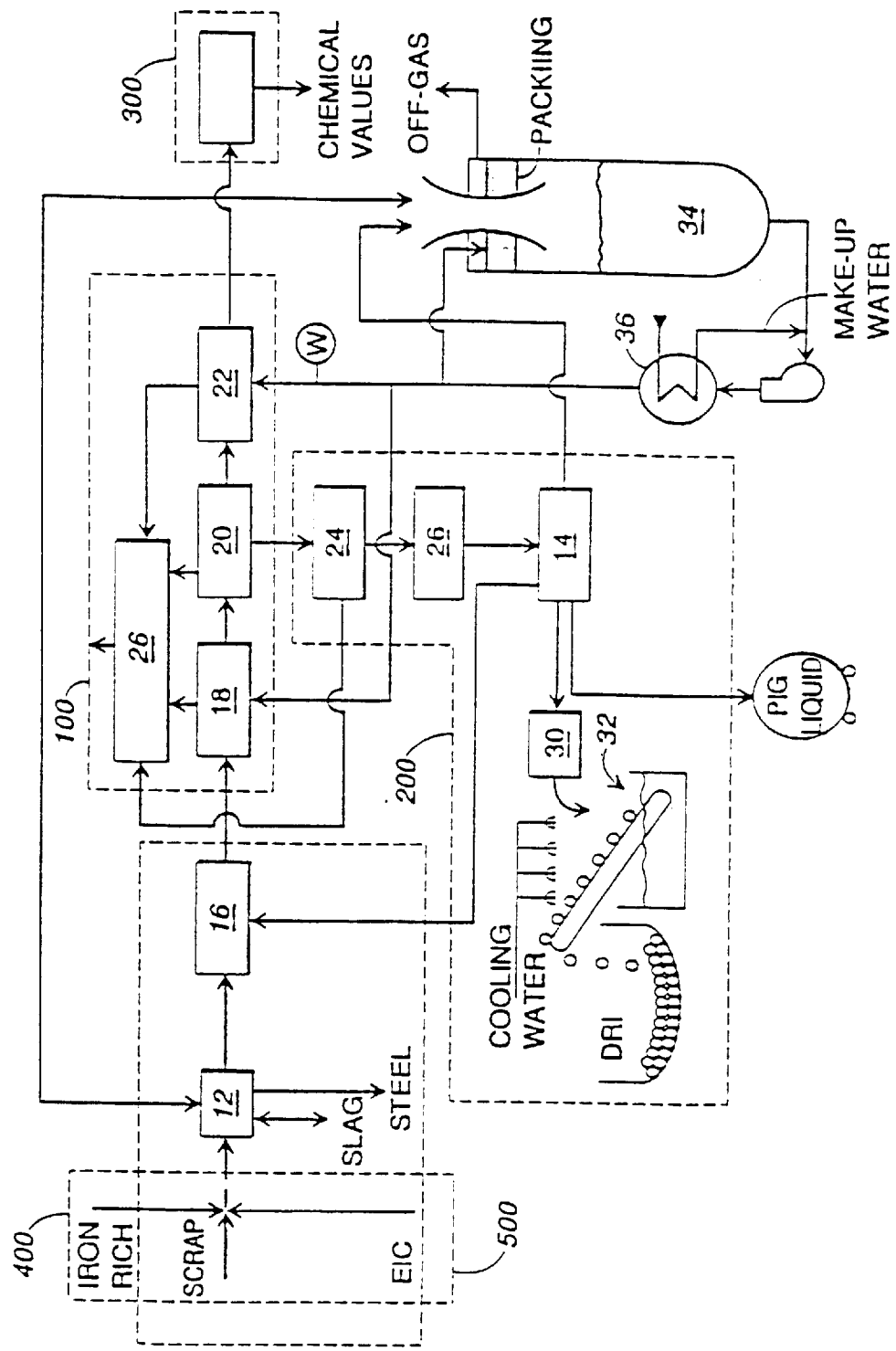
FIG. 1 is a schematic of a representative process which includes the present invention.

Referring to FIG. 1, a preferred embodiment of an overall waste stream recovery process is shown. Subprocess 100, the digestion and filtration steps, generally comprises the process disclosed and claimed in U.S. Pat. No. 5,464,596. Subprocess 200, the DRI production steps, generally comprises the process disclosed and claimed in U.S. applications Ser. Nos. 08/348,446 and 08/665,043. Subprocess 300, the chemical values recovery steps, when combined with subprocess 100, generally comprises the process disclosed and claimed in U.S. Pat. No. 5,453,111. Subprocess 400, the enhanced DRI production steps, when combined with subprocess 200, generally comprises the process disclosed and claimed in U.S. Pat. No. 5,571,306. Each of subprocesses 200, 300, and 400 may be added to the general process. The U.S. patents mentioned in this paragraph are incorporated herein by this reference.

Subprocess 200 comprises the leaching steps. Subprocess 500 comprises the feed process and includes the relevant step of heating the waste stream in a reducing atmosphere. Feed streams such as iron poor waste fume streams from electric arc furnaces 12 and other furnaces such as reduction furnaces or smelters 14 are filtered in a baghouse 16. Other feed streams such as iron rich DRI and pig iron, as well as scrap iron and steel, are subjected to the iron or steel making process. Exhaust fumes from such processes, which typically include an electric arc furnace or other reduction furnace, also are filtered in a baghouse 16. The constituents filtered out in baghouse 16 comprise the waste stream feed to subprocess 100.

In subprocess 500, the waste feed stream is heated in a reducing atmosphere, resulting in the reduction of the iron compounds into DRI. This heating typically occurs at between about 500° C. and 1315° C., and preferably at between 980° C. and 1260° C. The DRI can be fed directly back into the industrial process, such as a steel making process. Exhausts from the heating step are recovered in a capture means, such as baghouse 16, and then subjected to the leaching and other chemical values recovery steps.

In subprocess 100, the waste stream feed is leached in digester 18 with ammonium chloride, preferably at approximately 90° C. and approximately 18–23% by weight concentration. Constituents soluble in ammonium chloride go into solution, while constituents insoluble in ammonium chloride, such as iron oxides, do not dissolve. At steady state the Group IA salts reach their saturation concentration in the solution and do not dissolve. The precipitates are filtered from the solution in filter 20. The filtered solution is sent to cementer 22, and subjected to subprocess 200 to recover other chemical values. The precipitate, which typically is a filter cake, is further treated to recover the Group IA salts and/or is sent to subprocess 300.

If the precipitate is sent to subprocess 300 prior to or instead of recovering the Group IA salts, the precipitate is dried and crushed in dryer/crusher 24. Exhaust gases from dryer/crusher 24 may be sent to a baghouse such as baghouse 16, but more typically are sent to an air scrubber such as air scrubber 26 for cleaning, as the exhaust gases from dryer/crusher 24 typically do not have a significant quantity of recoverable constituents. The dried and crushed precipitates are compacted in compactor 28 and sent to a reduction furnace or smelter 14. In reduction furnace 14, the dried and crushed iron cake is heated at between 980° C. and 1315° C., producing an enriched iron cake (EIC) which can comprise DRI and pig iron, which can be in liquid form. The EIC can be compacted in a second compactor 30, and then cooled by cooling water in a cooling conveyor 32, to produce the DRI. The DRI then can be used as the feed to a steel mill EAF, and the process cycle starts over.

Exhaust fumes from the reduction furnace 14 are sent to scrubber 34, which preferably is a recirculating wet scrubber using water or an aqueous ammonium chloride solution. Exhaust fumes from EAFs such as EAF 12 also can be sent to scrubber 34. In scrubber 34, the exhaust flumes are scrubbed and the scrubbed off-gas released. The water or aqueous ammonium chloride solution containing the constituents scrubbed from the exhaust fumes is sent either to cementer 22 or digester 18, depending on purity; more pure solutions typically are sent to digester 18, while less pure solutions typically are sent to cementer 22.

In one embodiment, the furnace 12, 14 off-gases comprise ZnO and other particulate impurities. If the off-gases are scrubbed in scrubber 34, the water balance is maintained using a temperature control such as heat exchanger 36. Additionally, the concentration of ZnO and other solubles in the scrubbing liquid may be controlled by the addition of water W to the cementer 22, or ammonium chloride to the scrubber 34. If an ammonium chloride solution is used as the scrubbing liquid, it is preferred to maintain the solution at approximately 90° C. and approximately 23% $NH_4Cl$.

Heating In A Reducing Atmosphere

The heating step can be carried out prior to the initial leaching step, and also optionally between a first and second leaching step. The waste stream is heated to temperatures greater than 500° C., but typically no greater than 1315° C. This temperature causes a reaction which causes a decomposition of the stable franklinite phase contained in the waste stream into zinc oxide and other components. The resulting zinc oxide can be removed by sublimation or extraction with an ammonium chloride solution, such as by following the steps detailed above under the general process. The resulting material after extraction has less than 1% by weight zinc.

The solid waste material can be reduced using many conventional processes, such as, for example, direct or indirect heating and the passing of hot gases through the dust. For example, non-explosive mixtures of reducing gases, such as hydrogen gas and nitrogen or carbon dioxide, can be passed through the waste material. Hydrogen gas is not the only species that may be used for reductive decomposition of franklinite. It is possible to use carbon or simple carbon containing species, including carbon-containing reducing gases and elemental carbon. Heterogeneous gas phase reductions are faster than solid state reductions at lower temperatures and therefore suggest the use of carbon monoxide. The carbon monoxide can be generated in situ by mixing the franklinite powder with carbon and heating in the presence of oxygen at elevated temperatures. The oxygen concentration is controlled to optimize CO production. The carbon monoxide may be introduced as a separate source to more clearly separate the rate of carbon monoxide preparation from the rate of Franklinite decomposition. The prepared zinc oxide then can be removed by either ammonium chloride extraction or sublimation.

Leaching Treatment

The exhaust stream from the reducing step (typically fumes) and, optionally a portion of the waste material, is subjected to an ammonium chloride leach. An ammonium chloride solution in water is prepared in known quantities and concentrations. If the two-stage leaching process is used, the feed material, such as the exhaust stream and waste material flue dust described in Table I combined with any other feed material source which contains iron oxide, is added to the ammonium chloride solution. Otherwise, the feed material first is heated in a reducing atmosphere. The majority of the waste mixture, including any zinc and/or zinc oxide, lead oxide, cadmium oxide, and other metal oxides, dissolves in the ammonium chloride solution. The iron oxide does not dissolve in the ammonium chloride solution. At steady state, the Group IA salts reach their saturation concentration in the solution and do not dissolve.

It has been found that an 18–23% by weight ammonium chloride solution in water at a temperature of at least 90° C. provides the best solubility for such a waste mixture. Concentrations of ammonium chloride below this range do not dissolve the maximum amount of zinc oxide from the waste mixture, and concentrations of ammonium chloride above about this range tend to precipitate out ammonium chloride along with the zinc oxide when the solution is cooled. Therefore, 18–23% has been chosen as the preferred ammonium chloride solution concentration. The iron oxide and inert materials such as silicates will not dissolve in the preferred solution.

Ammonium sulfate may be added to the leaching solution to reduce and/or remove excess calcium build-up during the process. The ammonium sulfate can be added to the leach tank prior to charging with dust. The calcium sulfate which forms will be filtered out with the iron cake and returned to the steel making furnace. The calcium will calcine to calcium oxide when it is heated during the steel making process. This method can also be used in using a rotary hearth furnace in the first step. The enriched dust in this process contains small amounts of calcium so that treatment will still be necessary on a smaller scale. The precipitated calcium sulfate along with unleashed solids will be returned to the rotary hearth furnace. The calcium sulfate will form calcium oxide and return with the iron units to the steel making.

The zinc oxide, as well as smaller concentrations of lead or cadmium oxide, are removed from the waste mixture by the dissolution in the ammonium chloride solution. The solid remaining after this leaching step contains Group IA salts, iron oxides and some impurities including zinc, lead, cadmium, and possibly some other impurities. By subjecting the leachate to evaporation, the leachate can be concentrated, thus precipitating out Group IA salts. As the ammonium chloride concentration rises, the Group IA salt solubility falls, causing additional precipitation.

Recovery of Group IA Salts

When processing these EAF dusts, zinc-containing wastes and fumes from rotary hearth furnaces, upon reaching steady state, the filter cake obtained after the first leaching step contains sodium chloride and potassium chloride since these have reached their saturation concentration in the ammonium chloride solution. The filter cake comprises true insolubles, which are mainly silicates, and water soluble salts, which are mainly sodium chloride and potassium chloride. The salts can be recovered by:

1. Washing the filter cake with water, dissolving all water soluble salts;
2. Optionally cementing out heavy metals such as lead using powdered zinc; and
3. Crystallizing out sodium chloride and potassium chloride salts either singly or mixed by selective evaporative crystallization or spray drying.

These steps preferably are carried out in combination with a complete waste stream recycling operation as disclosed herein. If the optional cementation step is carried out, the heavy metals cemented out are filtered from the aqueous solution and sent on to a mixed metals separation step, such as Subprocess 300.

The production of Group IA salts can be carried out to continuously remove the sodium chloride and potassium chloride salts during each cycle of an overall waste stream recycling process, such as that disclosed herein, so that the filter cake would not contain any significant amount of these salts. This can be done by taking the recycle stream going to the evaporator condenser and evaporating the stream to an ammonium chloride concentration which results in the precipitation of the sodium chloride and potassium chloride, since the salts solubility goes down as the ammonium chloride concentration goes up. The precipitated solid salts then can be filtered from the solution, dried and bagged. The salts then can be subjected to further separation into specific salts by another crystallization step.

Optional Carbon Addition Step

The present process also can be operated to produce a high-quality iron-carbon cake as a residual product. The iron oxide contained in the waste stream does not go into solution in the ammonium chloride solution, but is filtered from the product solution as undissolved material. This iron oxide cake can be used as is as the feedstock to a steel mill; however, as previously discussed, it becomes more valuable if reduced by reaction with elemental carbon to produce an iron-carbon or direct-reduced iron product. One preferred method for producing such an iron-carbon or direct-reduced iron product from the waste material comprises the steps of, after first heating the waste stream in a reducing atmosphere:

a. treating the waste material with an ammonium chloride solution at an elevated temperature to form a product solution which comprises dissolved zinc and dissolved zinc oxide whereby any iron oxide in the waste material will not go into solution and Group IA salts will precipitate out;

b. adding carbon to the product solution whereby the carbon will not go into solution;

c. separating the product solution from the undissolved materials present in the product solution including the Group IA salts, any of the iron oxide and the carbon; and d. washing the undissolved materials to dissolve and remove the Group IA salts for recovery, leaving the iron oxide and the carbon as an undissolved solid.

A mixture of iron oxide and carbon is used by the steel industry as a feedstock for electric arc furnaces. The iron oxide cake which is removed as undissolved material from the leaching step is primarily iron oxide, being a mixture of $Fe_2O_3$ and $Fe_3O_4$. The iron oxide cake can be made into the mixture of iron oxide and carbon by adding elemental carbon to the iron oxide cake in several manners. First, carbon can be added to the leaching tank at the end of the leaching step but before the undissolved materials are separated from the product solution. Since the carbon is not soluble in the ammonium chloride solution and will not react in an aqueous solution, the iron oxide cake and the carbon can be separated from the product solution and made into a hard cake. Different size carbon, such as dust, granules, or pellets, may be used depending on the desires of the steel makers. Second, the carbon can be added to the iron oxide after the iron oxide has been separated from the product solution. The dried iron oxide and the carbon can be ribbon blended in a separate process. Combining carbon and iron oxide in a reducing atmosphere and at an elevated temperature results in the reduction of the iron oxide, producing DRI.

Generally the iron oxide and carbon product is pressed into a cake for ease of handling and use. The cake typically contains approximately 82% solids, but may range from 78% to 86% solids and be easily handled and used. Although cakes of less than 78% solids can be formed, the other 22%+of material would be product solution which, if the cake is used as a feedstock to a steel mill, would be reintroduced to the steel-making process, which is uneconomical. Likewise, drying the cake to have more than 86% solids can be uneconomical.

The iron oxide cake can be treated in three manners. First, the iron oxide-carbon cake can go directly to the steel mill and, if it goes directly to the steel mill, then the reduction of the iron oxide would take place in the steel mill furnace. Second, the iron oxide-carbon cake can be pelletized and roasted in a reduction furnace to form direct reduced iron. The iron oxide precipitate, which typically contains around 80% solids, is ground up with carbon and formed into pellets, briquettes or cubes and then heated. These pellets, briquettes or cubes then can be introduced to a steel making furnace. The difference in the material that would be introduced to the furnace from the first manner and the second manner is that in the second manner, direct reduced iron is introduced to the steel making furnace, while in the first manner, a combination of iron oxide and carbon is introduced to the steel making furnace. The iron oxide plus carbon can be supplied to the steel mill as is. When this carbon enriched iron oxide is melted, it forms a foamy slag, and a foamy slag is desirable in steel making. Third, the carbon can be added through a ribbon blender, and then the iron oxide-carbon cake can be introduced either directly into the furnace or, preferably roasted in a reduction furnace first to form direct reduced iron, which would be preferred for steel making.

In order of preference, the first manner is the least preferable, that is adding the material itself as a mixture of carbon and iron oxide without any reducing agents mixed in with it. The second most preferable is the third manner, adding the material with carbon added to it either through the leaching step or through a ribbon blender and put directly into the furnace. The most preferable is the second manner, where carbon is added either though the leaching step or a ribbon blender, pelletizing or briquetting it, roasting it, and introducing it to the steel furnace.

In any manner, the fumes exhausting from the steel mill furnace and the reduction furnace typically are iron poor, but comprise Group IA salt constituents and other valuable components. The furnace exhaust fumes are an excellent source of iron poor waste materials useful for recovery in the present process. The exhaust fumes may be filtered in a baghouse, with the resulting filtrate being added to the waste stream feed of the present process, or with the resulting filtrate being the primary waste stream feed of the present process. The exhaust fumes also may be scrubbed in a wet scrubber, with the resulting loaded scrubbing solution being added to the ammonium chloride leachant of the present process. If an ammonium chloride scrubbing solution is used instead of water, the loaded ammonium chloride scrubbing solution may be used as the primary leachant of the present process.

Optional Recovery of Zinc Oxide From Product Solution

To recover the zinc oxide from the product solution in subprocess 300, while the filtered zinc oxide and ammonium chloride solution is still at a temperature of 90° C. or above, finely powdered zinc metal is added to the solution. Through an electrochemical reaction, any lead metal and cadmium in solution plates out onto the surfaces of the zinc metal particles. The addition of sufficient powdered zinc metal results in the removal of virtually all of the lead of the solution. The solution then is filtered to remove the solid lead, zinc and cadmium.

Powdered zinc metal alone may be added to the zinc oxide and ammonium chloride solution in order to remove the solid lead and cadmium. However, the zinc powder typically aggregates to form large clumps in the solution which sink to the bottom of the vessel. Rapid agitation typically will not prevent this aggregation from occurring; however mixing with high shear forces typically will. Alternatively, to keep the zinc powder suspended in the zinc oxide and ammonium chloride solution, any one of a number of water soluble polymers which act as antiflocculants or dispersants may be used. In addition, a number of surface active materials also will act to keep the zinc powder suspended, as will many compounds used in scale control. These materials only need be present in concentrations of 10–1000 ppm. Various suitable materials include water soluble polymer dispersants, scale controllers, and surfactants, such as lignosulfonates, polyphosphates, polyacrylates, polymethacrylates, maleic anhydride copolymers, polymaleic anhydride, phosphate esters and phosponates. Flocon 100 and other members of the Flocon series of maleic-based acrylic oligomers of various molecular weights of water soluble polymers, produced by FMC. Corporation, also are effective. Adding the dispersants to a very high ionic strength solution containing a wide variety of ionic species is anathema to standard practice as dispersants often are not soluble in such high ionic strength solutions.

At this stage there is a filtrate comprising zinc compounds, and a precipitate of Group IA salts, lead, cadmium and other products. The filtrate and precipitate are separated, with the precipitate being further treated to capture the Group IA salts and other chemical values. The filtrate also may be cooled resulting in the crystallization and recovery of zinc oxide and/or subjected to electrolysis resulting in the generation and recovery of metallic zinc.

The filtrate then can be treated to crystallize out the complex salt diamino zinc dichloride. This can be done in a conventional crystallizer by cooling the filtrate to the proper temperature, generally between about 20° C. and 60° C. The crystallized diamino zinc dichloride then can be mixed with 25° C.–100° C. water to decompose the diamino zinc dichloride into zinc oxide and ammonium chloride. Particle size may be controlled as described in related specifications.

The zinc oxide then can be dried using a ring dryer or other drying means.

Iron By-Product Recycle

Iron-rich by-products produced during the recovery process can be processed further to obtain an end product which can be recycled back into the leaching step of the recovery process of the present invention. The iron-rich by-products preferably are reduced to DRI in a reduction furnace. During the reduction process, exhausts fumes which consists primarily of zinc, lead and cadmium are produced in the reduction furnace.

In accordance with a first embodiment, the DRI is sent to a steel mill where it is used in the production of steel. The steel production process results in exhaust fumes which are processed through the baghouse or/and a wet scrubber, either or both of which can be located at the steel mill. Fumes processed through the baghouse are filtered, and the captured solid residuum, along with an added amount of EAF dust, is recycled back into the waste materials stream whereby it is returned to the leaching step of the recovery process. Fumes processed through the wet scrubber are scrubbed in a liquid stream and the residual impurities obtained from the scrubbing process are discharged from the wet scrubber directly into the ammonium chloride solution of the leaching step.

In accordance with a second embodiment, the fumes exhausted from the reduction furnace used to produce the DRI are processed through the baghouse or/and the wet scrubber. Fumes processed through the baghouse are filtered, and the captured solid residuum is recycled back into the waste material stream, whereby it is returned to the ammonium chloride solution of the leaching step. In this embodiment, no EAF dust need be added in with the solid residuum. Fumes processed through the wet scrubber are scrubbed in a liquid stream and the residual impurities obtained from the filtering process are discharged from the wet scrubber directly into the ammonium chloride solution of the leaching step.

The above detailed description of a preferred embodiment is for illustrative purposes only and is not intended to limit the spirit or scope of the invention, or its equivalents, as defined in the appended claims.

What is claimed is:

1. A method for the production of Group IA salts during a process for the recovery of zinc and/or iron values from a waste stream comprising Group IA compounds, iron compounds and zinc compounds, comprising the steps of:
   a. heating the waste stream at an elevated temperature in a reducing atmosphere resulting in the production of exhaust fumes comprising Group IA compounds and zinc compounds;
   b. treating the exhaust fumes with an ammonium chloride solution at an elevated temperature to form a product solution which comprises dissolved zinc compounds and an undissolved solid which comprises the Group IA salts and iron compounds;
   c. washing the undissolved precipitate with water to form a salt solution which comprises the dissolved Group IA salts and an undissolved solid; and d. recovering the Group IA salts from the salt solution.

2. The method as claimed in claim 1, wherein the exhaust fumes are treated at steady state with the ammonium chloride solution.

3. The method as claimed in claim 2, wherein the Group IA compounds are sodium and potassium compounds and the Group IA salts are sodium chloride and potassium chloride.

4. The method as claimed in claim 3, wherein the concentration of the ammonium chloride solution is approximately 18–23% by weight.

5. The method as claimed in claim 4, wherein the waste stream is heated in a reducing atmosphere at an elevated temperature of at least 500° C.

6. The method as claimed in claim 5, wherein the Group IA salts are recovered from the salt solution via crystallization.

7. The method as claimed in claim 6, wherein the crystallization is evaporative crystallization.

8. The method as claimed in claim 6, wherein the potassium chloride is crystallized out of the salt solution prior to the sodium chloride.

9. The method as claimed in claim 5, wherein the Group IA salts are recovered from the salt solution via spray drying.

10. The method as claimed in claim 1, wherein the iron compounds in the waste stream are reduced to direct reduced iron when the waste stream is heated in the reducing atmosphere.

11. The method as claimed in claim 10, wherein the undissolved solid comprises iron compounds in the form of direct reduced iron.

12. The method as claimed in claim 11, wherein the undissolved solid is used as a feedstock to a steel mill.

13. The method as claimed in claim 1, wherein the product solution is subjected to a concentration process thereby effecting the precipitation of a greater quantity of Group IA salts.

14. The method as claimed in claim 6, wherein the salt solution remaining after crystallization is further treated to recover chemical values.

15. The method as claimed in claim 9, wherein the salt solution remaining after spray drying is further treated to recover metal values.

16. The method as claimed in claim 1, further comprising the step of adding zinc metal to the product solution whereby any zinc-displaceable metal ions contained within the product solution are displaced by the zinc metal and precipitate out of the product solution as metals.

17. The method as claimed in claim 16, further comprising the steps of separating the metals from the product solution and lowering the temperature of the product solution thereby precipitating at least a portion of any zinc component of the product solution as a mixture of crystallized zinc compounds.

18. The method as claimed in claim 17, further comprising the steps of separating the crystallized zinc compounds from the product solution and washing the crystallized zinc compounds with a wash water thereby solubilizing certain of the zinc compounds, and separating any remaining crystallized zinc compounds from the product solution and drying the remaining crystallized zinc compounds at a temperature of between about 100200 C. and 200° C. resulting in the recovery of a zinc oxide product of 99% or greater purity.

* * * * *